United States Patent
Kim et al.

(10) Patent No.: US 6,565,035 B1
(45) Date of Patent: May 20, 2003

(54) APPARATUS AND METHOD FOR FORMING AN AIR CURTAIN FOR USE WITH AN AIRCRAFT

(75) Inventors: John J. Kim, Riverside; Won Wook Choi, Irvine; Myles A. Rohrlick, Oceanside, all of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/438,159

(22) Filed: Nov. 11, 1999

(51) Int. Cl.7 .............................................. B64D 13/00
(52) U.S. Cl. ................. 244/1 R; 244/118.1; 244/129.5; 244/130; 244/207; 454/71; 454/189; 454/192
(58) Field of Search .............................. 244/118.3, 1 R, 244/129.1, 129.4, 129.5, 130, 207, 208, 209; 454/71, 187, 189, 191, 192; 160/327, 18

(56) References Cited

U.S. PATENT DOCUMENTS

| | | | |
|---|---|---|---|
| 983,877 A | * 2/1911 | Cummings | ................... 454/189 |
| 1,173,555 A | * 2/1916 | Caldwell | ..................... 454/189 |
| 2,896,881 A | * 7/1959 | Attinello | ..................... 244/207 |
| 2,939,374 A | * 6/1960 | Caille | ......................... 454/189 |
| 3,138,347 A | * 6/1964 | Rodriguez | .................. 244/207 |
| 3,147,942 A | * 9/1964 | Griffith | .................... 244/118.3 |
| 3,347,495 A | * 10/1967 | Eberhardt et al. | ........... 244/207 |
| 3,726,203 A | 4/1973 | Lindestrom | |
| 3,726,204 A | 4/1973 | Lindestrom | |
| 3,803,995 A | 4/1974 | Allander | |
| 3,887,147 A | * 6/1975 | Grieb | ......................... 244/207 |
| 4,121,790 A | 10/1978 | Graham | |
| 4,137,831 A | 2/1979 | Howorth | |
| 4,606,259 A | 8/1986 | Nystrom | |
| 4,736,913 A | * 4/1988 | Bennet et al. | ............... 244/130 |
| 4,858,850 A | * 8/1989 | McNay | ......................... 244/130 |
| 5,263,897 A | 11/1993 | Kondo et al. | |
| 5,765,635 A | 6/1998 | Rhee | |
| 5,865,880 A | 2/1999 | Matsui | |
| 5,897,079 A | 4/1999 | Specht et al. | |

* cited by examiner

*Primary Examiner*—Galen L. Barefoot
(74) *Attorney, Agent, or Firm*—Harness Dickey & Pierce P.L.C.

(57) ABSTRACT

A system and method for providing an air curtain for impeding the entry of dust, dirt, debris, smoke, insects and other airborne particulate matter into an interior area of an aircraft without the need for disposing heavy, bulky and high power consuming blower assemblies above the opening in the aircraft. The invention comprises a pair of air intake ducts each having a fan disposed therein. The fans draw an ambient airflow into the air intake ducts. Pressurized air from a power unit associated with the aircraft, such as an engine or auxiliary power unit, is injected into the air intake ducts. This has the effect of significantly accelerating the airflow in the air intake ducts to a velocity suitable for forming an air curtain. The air intake ducts are coupled to a manifold having a length sufficient to substantially span the opening of an aircraft at which the air curtain is formed. An air dispenser associated with the manifold directs the airflow out of the manifold in a narrow, width-wise pattern to form an air curtain. In preferred embodiments the manifold can be rotated in accordance with the position of a loading ramp of the aircraft such that the angle of impingement of the air curtain relative to the ramp can be precisely controlled. A flow control system also enables the pressurized airflow injected into each air intake duct to be varied in accordance with the distance of the ramp surface from the air dispenser.

13 Claims, 4 Drawing Sheets

APPARATUS AND METHOD FOR FORMING AN AIR CURTAIN FOR USE WITH AN AIRCRAFT

TECHNICAL FIELD

This invention relates to apparatuses and methods for forming air curtains, and more particularly to an apparatus and method specifically adapted for use with an aircraft to form an air curtain at a desired area of an aircraft such as a cargo door opening.

BACKGROUND OF THE INVENTION

Background Art

Air curtains are typically used in buildings having a portion which is open to the ambient environment, and where it is desirable to form a barrier to prevent the entry of airborne contaminants into the building. The air curtain is used to form a wall of air which acts as an impediment to the entry of dust, dirt and debris, as well as insects and other undesirable elements into the open area of the building. The air curtain also can help to form a temperature boundary by producing a pressure differential between the interior of the building and the outer ambient environment.

Typically, air curtains are formed by placing a plurality of high flow capacity blower systems alongside one another in an overhead orientation along the full width of the opening where the air curtain is to be formed. One such prior art blower system 200 is shown in FIG. 7. The blower system 200 includes a duct 202 within which is mounted a fan or blower 204. The fan or blower 204 is driven by an electric motor (not shown) which is also disposed within the duct 202. The blower draws air into the duct 202 and discharges it at an outlet at a suitably high velocity to form a wall or curtain 206 of air.

Blower systems such as that shown in FIG. 7 are typically quite large, heavy, noisy and bulky units and are entirely unsuitable for use with commercial or military aircraft. Furthermore, such prior art blower systems typically require a significant amount of electrical power to operate, which further makes the integration of such blower systems into an aircraft impossible or impractical.

Commercial and military aircraft nevertheless would significantly benefit if a system for forming an air curtain could be installed on the aircraft without introducing significant expense, weight, and without requiring significant modifications to the structure of the aircraft or significant electrical power to operate. The use of an air curtain would be highly desirable, for example, with cargo aircraft which have a relatively large cargo door which is opened during loading and removal of cargo from the fuselage of the aircraft. Since many such cargo aircraft are forced to operate in environments where a high degree of dust, dirt, smoke and even insects may be present, the use of an air curtain would be highly useful for preventing the entry of such elements into the fuselage of the aircraft during loading or unloading operations.

Still another important use for an air curtain would be in preventing the entry of chemical and biological warfare (CBW) airborne contaminants into a cargo bay or other interior area of an aircraft, such as during loading and unloading of a cargo compartment of the aircraft. Such a system would also help to reduce the in-flight CBW decontamination time by air purging that is presently required with military aircraft.

Accordingly, it would be highly desirable to provide an air curtain adapted specifically for use with an aircraft to provide a relatively narrow, width-wise wall of air which acts as a boundary to impede the entry of dust, dirt, smoke, insects or other airborne contaminants into an interior area of an aircraft while the interior area is exposed to the ambient environment. It would further be highly desirable to provide an air curtain adapted specifically for use with an aircraft which can be cost effectively installed on the aircraft and which does not require a plurality of heavy, high power consuming and bulky electric blower devices to be mounted within the aircraft.

Still further, it would be highly desirable to provide a system for forming an air curtain which is specifically adapted for use with an aircraft to provide a wall of air at a cargo door opening area of the aircraft to prevent the entry of dust, dirt, debris, smoke, insects and other airborne particulate matter into the fuselage of the aircraft, and where the angular orientation of the air curtain can be controllably adjusted for maximum effectiveness in forming a barrier to the entry of foreign, airborne particulate matter into the fuselage of the aircraft.

SUMMARY OF THE INVENTION

The above and other objects are provided by an apparatus and method for forming an air curtain in accordance with preferred embodiments of the present invention. The apparatus of the present invention is specifically adapted for use with an aircraft, although it will be appreciated that the system and method of the present invention will find utility in a variety of other applications, such as with transport vehicles and ground facilities, where it is impossible or undesirable to mount a plurality of heavy, bulky, high power consuming prior art blower devices in an overhead orientation to form an air curtain.

The apparatus and method of the present invention comprises at least one air intake duct which is disposed adjacent a portion of the aircraft, such as adjacent a cargo doorway formed in the fuselage of the aircraft. The air intake duct includes a fan for drawing ambient air into the duct. Preferably, a filter is also included at the intake side of the air intake duct to filter out dust, dirt, insects and other airborne contaminants. The air intake duct is coupled to a manifold which is disposed in an overhead fashion across the opening where it is desired to form an air curtain. A power unit of the aircraft is coupled via a suitable conduit to the air intake duct and includes an injector nozzle for injecting a pressurized airflow supplied by the power unit directly into the air intake duct. The pressurized airflow operates to significantly accelerate the ambient airflow delivered by the fan to produce a high pressure airflow which is directed into the manifold.

The manifold includes an outlet through which the high pressure airflow is directed to form the air curtain. In one preferred embodiment an air dispenser is secured to the outlet of the manifold. The air dispenser directs the high pressure airflow passing through the outlet of the manifold into a narrow, width-wise air stream which forms the air curtain.

The apparatus and method of the present invention thus entirely eliminates the need for overhead mounting of a plurality of large, heavy, bulky and power consuming electric blowers across the full width of the opening where the air curtain is to be formed. This significantly eases integration and implementation of the present invention into existing aircraft with a minimal degree of modifications needed to the fuselage of the aircraft.

In another preferred embodiment the manifold is mounted for rotational movement about an axis extending longitudinally along the manifold. A mechanism is included for rotating the manifold in a controlled fashion. In one preferred form this mechanism comprises an electric stepper motor. A position control system may also be included for monitoring the angular position of the manifold and controlling the stepper motor such that the manifold is rotated as needed to maintain a desired angular orientation. The ability to modify the angular orientation is desirable in those applications where, for example, the floor of the structure at which the air curtain is being directed is movable, such as when the floor comprises a loading ramp of a cargo aircraft. In such applications it is highly desirable to be able to vary the angular direction of the air curtain in accordance with the angle of the loading ramp to maintain optimum effectiveness of the air curtain in forming a barrier to the entry of airborne dust and dirt particulates, insects, etc.

In the preferred embodiment described above, the position control system is also responsive to the position of the manifold and the position of the loading ramp of a cargo aircraft which the air curtain impinges. The position control system allows the manifold to be rotated closely in accordance with the angular position of the ramp to thus maintain the air curtain at a desired angular orientation for maximum effectiveness.

In the preferred embodiment described above a flow control system is also incorporated for controlling the flow of pressurized air into the air intake duct. This enables the force of the air discharged from the manifold to be varied in accordance with a changing height of a floor which the air curtain impinges. Thus, the pressure of the air stream forming the air curtain can be varied in accordance with the distance of the manifold from a floor member such as a loading ramp.

The apparatus and method of the present invention thus forms a low cost, easy to install means for forming an air curtain specifically adapted for use with an aircraft. Advantageously, the system of the present invention makes use of a pressurized airflow provided by a power unit of the aircraft, such as an engine or an auxiliary power unit, to accelerate the ambient airflow within the air intake duct to produce a pressurized airflow within the manifold which is of suitable velocity to form an air curtain.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
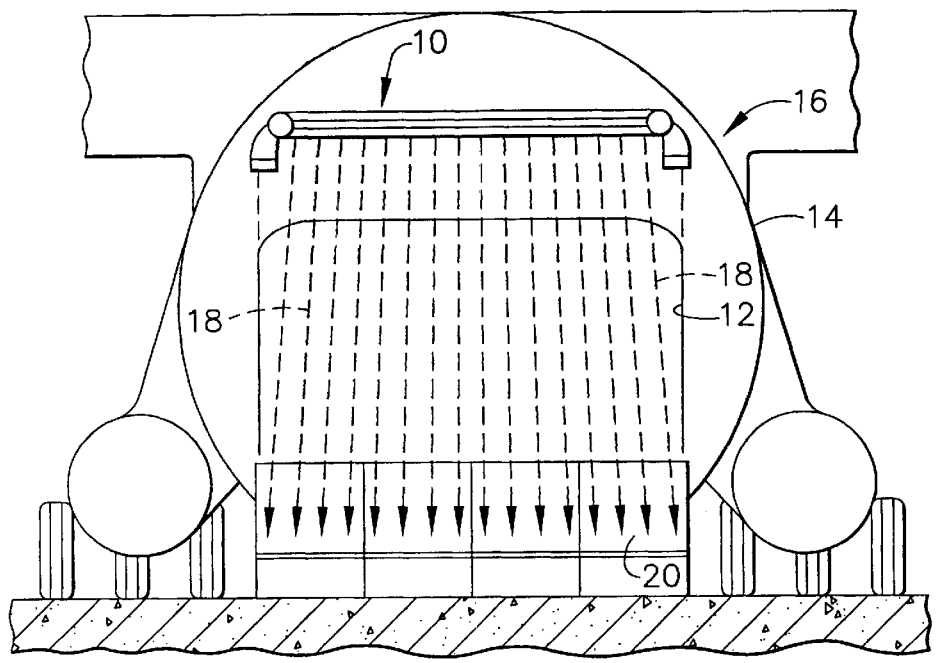
FIG. 1 is a rear view of an aircraft illustrating a preferred embodiment of the present invention disposed in an overhead fashion over a cargo door opening in the fuselage of the aircraft, and directing an air curtain down against a loading ramp extending from the cargo opening.

Referring to FIG. 1, there is shown a system 10 for forming an air curtain across an opening 12 in a fuselage 14 of an aircraft 16. In this example, the opening 12 forms a cargo door opening, but it will be appreciated immediately that the system 10 could be used to form an air curtain at virtually any other location on the aircraft where it is desired to impede the entry of dust, dirt, smoke, chemical and biological warfare elements, insects and other airborne contaminants into the aircraft 16. The air curtain is designated by arrows 18 and extends preferably the entire, or substantially the entire, width of the cargo door opening 12. The force of the air curtain 18 is sufficient to form a barrier against the entry of airborne particulates down to a loading ramp 20 of the aircraft 16.

Figure 2:
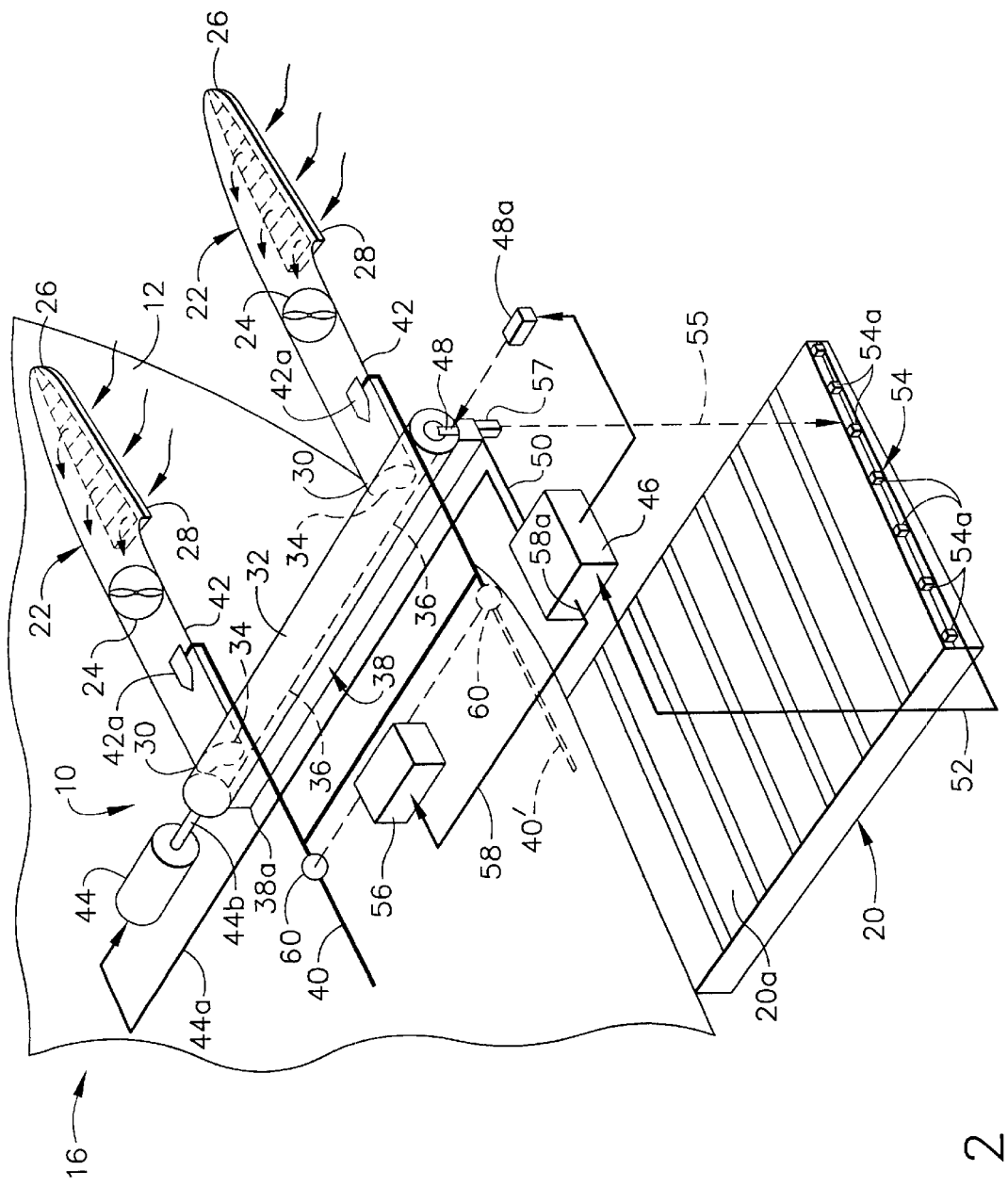
FIG. 2 is a simplified perspective schematic drawing of a preferred embodiment of the present invention disposed above the loading ramp of FIG. 1.

Referring to FIG. 2, the system 10 is shown in greater detail. The system 10 includes at least one, and preferably a pair, of air intake ducts 22 disposed adjacent opposite width-wise ends of the cargo door opening 12. Each air intake duct 22 includes a fan assembly 24 disposed therein for drawing ambient air into its associated air intake duct 22. Preferably, a filter element 26 is disposed at the opening 28 of each air intake duct 22 to filter undesirable airborne particulates and prevent same from being drawn into the air intake ducts 22. The fan assemblies 24 may vary significantly in capacity depending upon the overall dimensions of the air curtain that needs to be formed. However, in one preferred embodiment each fan assembly 24 comprises a two horsepower axial fan assembly capable of producing an airflow of about 4,000 CFM (about 112 cubic meters per minute).

Each air intake duct 22 includes an outlet end 30 which is coupled to an associated inlet 34 formed at opposite longitudinal ends of an elongated, tubular manifold 32. The manifold 32 has a pair of narrow, elongated outlets 36 which are in airflow communication with an air dispenser member 38. The manifold may be made from lightweight sheet metal, aluminum or possibly even PVC tubing.

An important advantage of the present invention is the use of a pressurized airflow from a component of the aircraft 16. This airflow may comprise a bleed airflow from the engine of the aircraft 16 or a pressurized airflow from a power unit or an auxiliary power unit (APU) of the aircraft 16. This pressurized airflow is supplied from one of these components of the aircraft 16 through a suitably small diameter conduit 40. Conduit 40 branches such that portions 42 thereof extend to each air intake duct 22. Alternatively, it will be appreciated that a second airflow conduit 40' could be incorporated and coupled to the aircraft's power unit so that no branching of the pressurized airflow is required at a point near the air intake ducts 22.

At the end of each portion 42 of conduit 40 an injector nozzle 42a is disposed. The injector nozzle 42a is positioned inside of its associated air intake duct 22 and functions to inject the pressurized airflow from its associated conduit 42 into the air intake duct 22 in a direction in accordance with that of the ambient airflow drawn in by its associated fan assembly 24. As will be explained further, this pressurized airflow injected into each air intake duct 22 serves to significantly accelerate the airflow generated by the fan assemblies 24 to a velocity suitable to form the air curtain 18.

Referring further to FIG. 2, in a preferred embodiment the manifold 32 is mounted to suitable structure for allowing rotation thereof about a limited arc. Rotational movement is imparted to the manifold 32 by coupling it to an output shaft 44b of a motor 44. It will be appreciated that other mechanisms for imparting rotational movement to the manifold 32 could be employed, but in the preferred embodiments the motor 44 comprises an electric stepper motor. The stepper motor 44 is controlled by control signals supplied on line 44a from a position controller 46 operating in connection with an optical sensor 48. The optical sensor 48 receives optical signals from an optical transmitter 48a which is driven by the position controller 46. The optical transmitter 48a is preferably secured to a portion of the aircraft 16 closely adjacent the manifold 32 such that there is little or no risk of objects passing between the small distance separating the optical sensor 48 from the optical transmitter 48a, which might potentially interfere with the monitoring of the manifold 32 position.

The optical sensor 48 is used to monitor the angular position of the manifold 32 and to provide output signals related thereto via suitable conductors 50 to the position controller 46. The position controller 46 also receives output signals via one or more conductors 52 which are coupled to a ramp positioning sensor array 54. The ramp positioning sensor array 54 preferably comprises a plurality of optical receiving elements 54a spaced apart along one edge of the ramp 20. These optical receiving elements 54a detect the presence of an optical signal 55 transmitted from a second optical transmitting element 57 fixedly secured to the air dispenser 38. The angular position of the ramp 20 affects where the optical signal 55 impinges the sensor array 54. This in turn affects the output of the sensor array 54, which produces an output signal indicative of which one of the sensors thereof are receiving the optical signal 55. Thus, this enables the position controller 46 to monitor the angular position of the ramp 20 relative to the manifold 32 position. The output from the ramp positioning sensor array 54 is also used by the position controller 46 to determine the approximate distance from the upper surface 20a of the ramp 20 to the lower edge 38a of the air dispenser 38. The sensor array 54 could be formed by a wide variety of photoelectric devices such as phototransistors or photodiodes, or possibly even infrared devices.

With further reference to FIG. 2, an airflow controller system 56 receives control signals via one or more conductors 58 from an output 58a of the position controller 46. These control signals control at least one flow control valve 60 in accordance with the sensed distance of the upper surface 20a of the ramp 20 from the lower edge 38a of the air dispenser 38. Thus, when the ramp 20 is lowered, thereby increasing this distance, the flow control system 56 is informed of this condition by the position controller 46 and it transmits control signals to valve 60 to open this valve to permit a greater amount of pressurized airflow to be injected into the air intake ducts 22. If a second airflow conduit 40' is incorporated, then preferably a second valve 60 is also included and controlled by the flow control system 56.

When the upper surface 20a of the ramp 20 is at a higher elevation, an airflow of lesser velocity out of the air dispenser 38 is required to form the air curtain 18 down to the upper surface 20a of the ramp 20. The flow control system 56 senses this to close valve(s) 60 slightly to reduce the pressurized airflow into the air intake ducts 22. In this manner the velocity of the airflow exiting the air dispenser 38 can be controlled both in angular orientation and in terms of magnitude to form an air curtain having a desired airflow velocity and desired angular position. This allows the air curtain to be positioned as needed for maximum effectiveness in impeding the entry of dust, dirt, smoke, insects and other airborne particulates, regardless of the position at which the ramp 20 needs to be maintained at during loading or unloading of the aircraft 16.

Figure 3:
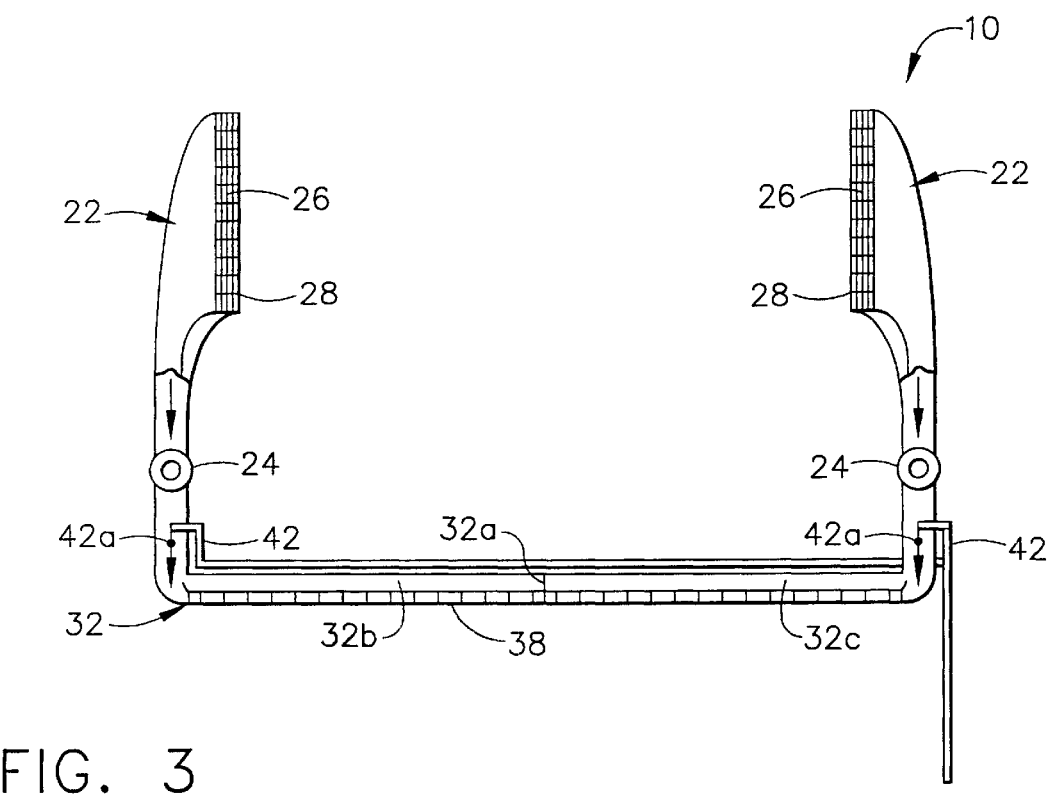
FIG. 3 is a view from beneath the apparatus of the present invention illustrating the openings in the air dispenser.

Referring to FIG. 3, the system 10 can be seen form a view underneath the manifold 32 with a portion of the air intake ducts 22 and manifold 32 broken away for illustrative purposes. The manifold 32 includes a center divider 32a which serves to separate the interior of the manifold 32 into independent, elongated channels 32b and 32c. Accordingly, the high pressure airflow supplied from the left most one of the air intake ducts 22 is used to supply channel 32b while the high pressure airflow from the right side air intake duct 22 supplies channel 32c of the manifold 32.

It will be appreciated that the width of the manifold 32 and air dispenser 38 can vary significantly, but in one preferred embodiment suitable for use with a large cargo aircraft the length of the manifold 32 will need to be on the order of about 17 feet (5.185 meters) in order to produce an air curtain having a width of about 18 feet (5.49 meters) at the upper surface 20a of the ramp 20. For smaller openings of the aircraft, a shorter manifold 32 may suffice. In general, however, the overall length of the manifold 32 will preferably be just slighter shorter than the maximum width of the air curtain that needs to be produced. With the preferred embodiments described herein, the two horsepower axial fans 24 are sufficient to produce an ambient airflow which can be used to form an air curtain having a maximum width of about 18 feet (5.49 meters) over a distance of about 11 ft–13 ft (3.35 m–3.97 m) from the air dispenser 38.

Figure 4:
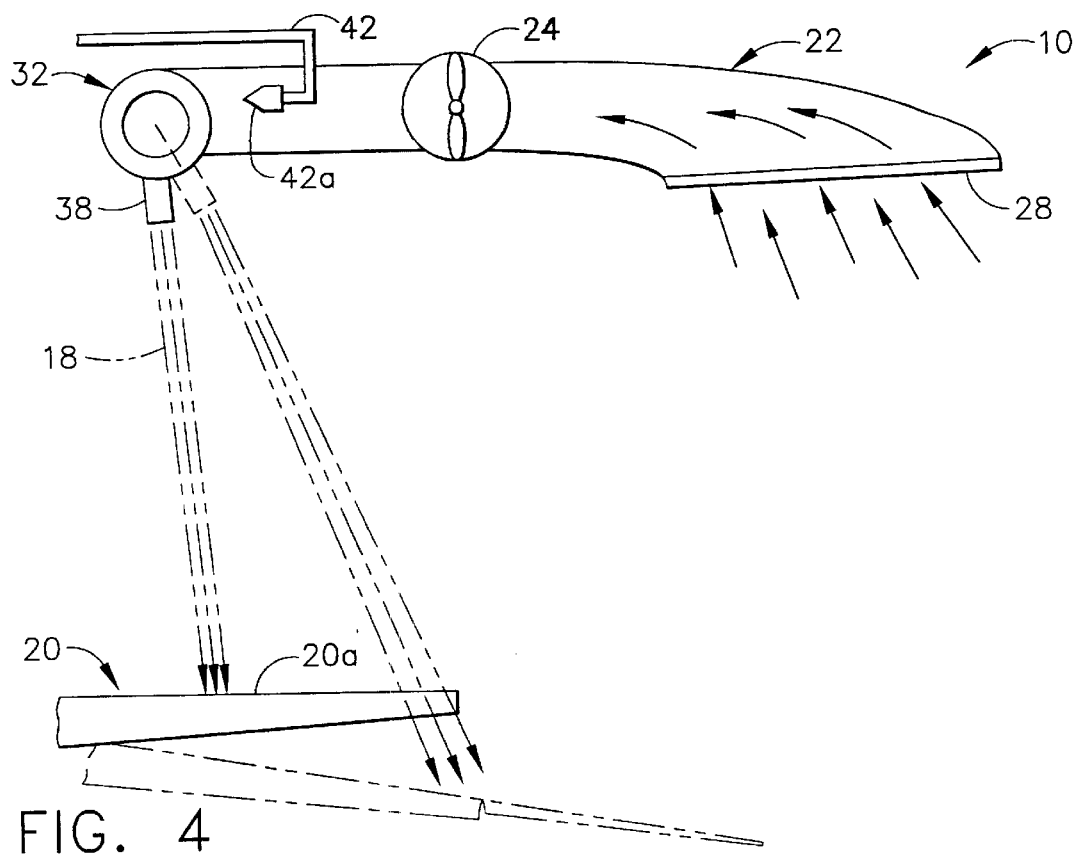
FIG. 4 is a simplified schematic representation of the invention from the side of the aircraft of FIG. 1, illustrating the apparatus directing an air curtain against the loading ramp shown in FIG. 1 when the loading ramp is in two different positions.

Referring now to FIG. 4, the manifold 32 is shown in two different positions. It will be appreciated that the air curtain 18 is preferably angled slightly outwardly of the opening with which it is associated. It is believed that in most instances angling the air curtain 18 slightly outwardly away from the opening will further help to repel airborne contaminants than if the air curtain 18 were to be directed along a perfectly vertical axis.

With further reference to FIG. 4, the air dispenser 38 is shown in dashed lines indicating that the manifold 32 has been rotated by the stepper motor 44 (FIG. 2) when the ramp 20 has been lowered. It will be appreciated that when the ramp 20 is in the lower position shown by the dashed lines, that a greater airflow velocity will need to be provided to extend the air curtain 18 down to the upper surface 20a of the ramp 20. Accordingly, when the ramp 20 is in the position shown indicated by dashed lines in FIG. 4, the flow control system 56 and position control system 46 sense this position of the ramp 20 and open the flow control valve(s) 60 such that the airflow to each injector 42a is increased, which in turn causes a greater degree of acceleration of the airflow through each air intake duct 22 into the manifold 32.

Figure 5:
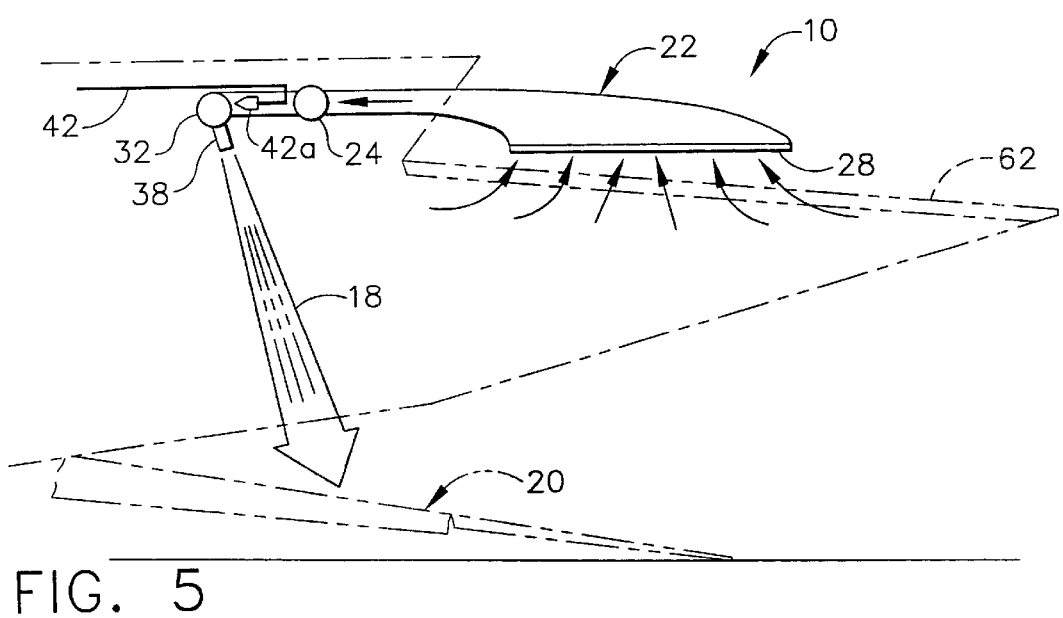
FIG. 5 is a simplified schematic view of the present invention further illustrating the ability of the apparatus to draw in ambient air into the air intake duct.

Referring to FIG. 5, it can be seen that the system 10 of the present invention can also be used in systems where a door 62 needs to be opened up to a position adjacent the inlet 28 of the air intake and the ramp 20 extends down to a ground surface.

Figure 6:
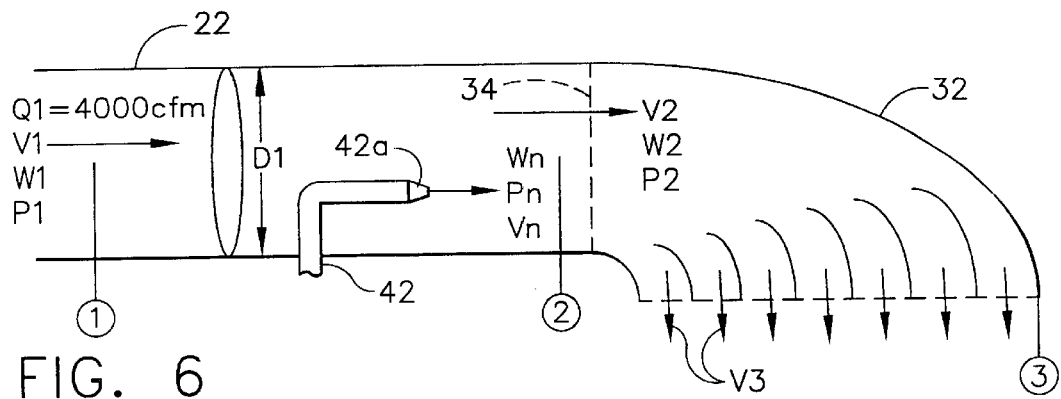
FIG. 6 is a simplified side view of the air intake duct and a portion of the manifold for helping to illustrate the changing flow of velocity of the air stream flowing through the air duct and into the manifold as a result of the pressurized airflow injected into the air intake duct.
Figure 7:
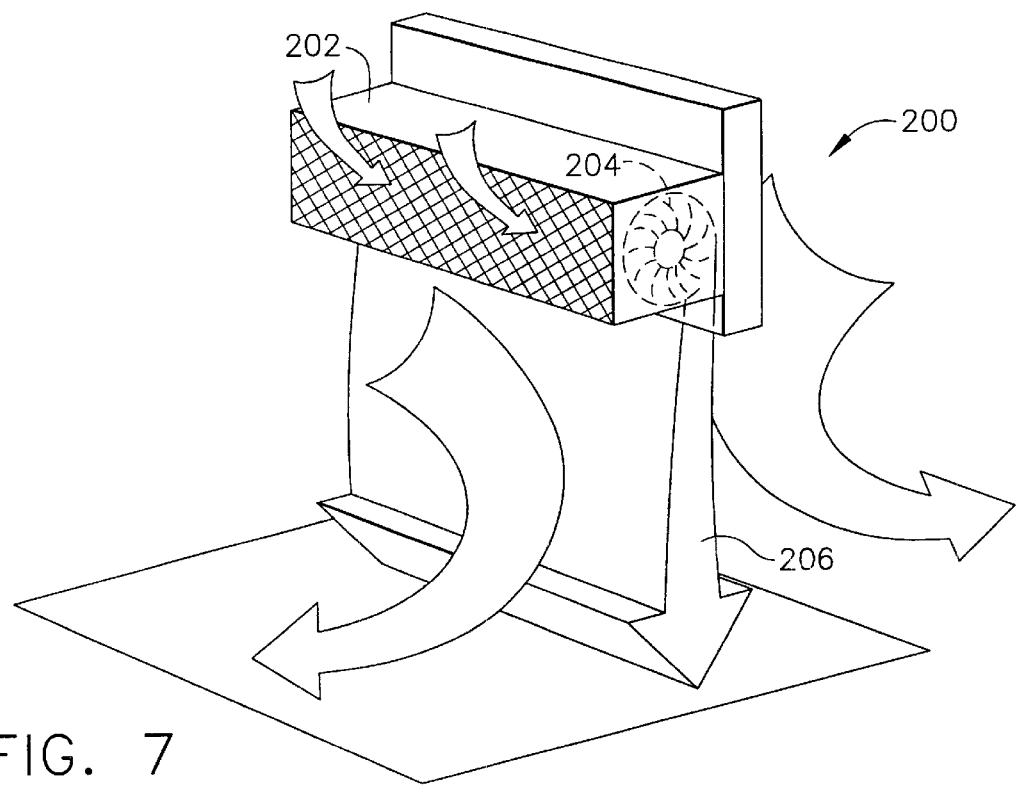
FIG. 7 is a perspective view of a typical prior art blower assembly.

Referring now to FIG. 6, a portion of the air intake duct 22 and a portion of the manifold 32 are shown. The continuity, momentum and energy of the airflow produced in the air intake duct 22 can be represented by the following equations 64–68 applied for points "1", "2" and "3" in the drawing of FIG. 6:

$$\text{Continuity} = W_2 = W_1 + W_n \quad \text{Equation 64}$$

$$\text{Momentum} = p_n A_n + \frac{w_n V_n}{g_c} + p_1 A_1 + \frac{w_1 V_1}{g_c} \quad \text{Equation 66}$$

$$= p_2 A_2 + \frac{w_2 V_2}{g_c}$$

$$\text{Energy} = c_p w_2 T_{02} = c_p w_1 T_{01} + c_p w_n T_{0n} \quad \text{Equation 68}$$

The above equations 64–68 can be applied for a typical air curtain configuration of 18 foot (5.49 meters) width produced with the assistance of a typical aircraft auxiliary power unit:

$p_1$=14.7 psia; $T_1$=70° F.; $Q_1$=4,000 cfm (112 cubic meters per minute); $A_1$=$A_2$=38.48 in$^2$ (248.27 cm$^2$) (Manifold 32 duct diameter: $D_1$=$D_2$=7 in) (17.78 cm); $A_3$=270 in$^2$ (1742.04 cm$^2$) (Air Dispenser 38 area: 2.5 inch width by 108 inch length)

where $P_1$ is the atmospheric pressure at sea level where $T_1$ is the temperature of the ambient airflow in the intake duct 22;

where $Q_1$ is the airflow velocity generated by the fan assemblies 24;

where $T_{01}$ is the total temperature of the airflow in the intake duct 22;

where $T_{02}$ is the total temperature of the airflow in the manifold duct 32.

$V_1$=$Q_1/A_1$=249.5 ft/s, $W_1$=$p_1 V_1 A_1$=5.0 lb/s $p_{On}$=40 psia, $T_{On}$=200° F., $W_n$=0.63 lb/s (choked injector nozzle 42a flow at nozzle diameter $D_n$=1 inch) (2.54 cm), $V_n$=49.02$(0.8333 T_{On})^{0.5}$=1,150 ft/s (flow velocity out of each injector nozzle 42a) (350 meters/sec)

where $P_{On}$ is the total pressure of airflow in the injector nozzle 42a; and where $T_{On}$ is the total temperature of airflow in the injector nozzle 42a.

Using the above equations, the flow conditions after flow injection are approximately:

$V_2$=296.3 ft/s (in Manifold 32)

$V_3$=42.23 ft/s=2,533 ft/min (772.57 meters/min) (through Dispenser 38 exit)

$T_{03}$=85° F.

where: $V_2$ represents the velocity of the airflow within the manifold 32;

$V_3$ represents the velocity of the airflow exiting the air dispenser 38; and $T_{03}$ represents the total temperature of the airflow exiting the air dispenser 38.

The above calculations demonstrate the velocity boost effect that the pressurized airflow from the aircraft's power unit has on the ambient airflow drawn into the air intake ducts 22 by the fan assemblies 24. The system 10 of the present invention thus provides a suitably high velocity airflow out of the air dispenser 38 for forming an air curtain without the need for mounting heavy, high power consuming and bulky blower combinations directly above the cargo opening 12 of the aircraft 16.

While the system 10 of the present invention provides an effective air curtain for preventing dust, dirt, debris, smoke, odors, insects and other undesirable airborne particulates from entering the fuselage of the aircraft 16, the system 10 is just as readily usable for filtering the air within the fuselage of the aircraft and/or reducing the in-flight chemical, biological warfare (CBW) decontamination time by air purging.

The following chart summarizes the advantages of the system 10 relative to a system using conventional blower assemblies for an air curtain having a width of about 17 feet (5.185 meters).

| Technology | Weight (lb) | Volume (cu. ft) | Power (hp) | Remarks |
|---|---|---|---|---|
| Conventional | 540 | 21.1 | 7.5 | 5 × 1.75 hp fans |
| System 10 | 75 | 7.5 | 4 | 2 × 2.0 hp fans |

It will also be appreciated that while the system 10 of the present invention is shown as being disposed in an overhead orientation relative to the cargo door opening 12, that horizontally directed air curtains could just as easily be formed at the cargo opening 12. This could readily be accomplished by disposing a pair of manifold sections on opposite sides of the opening 12 and directing a pair of horizontally disposed airflows to form a pair of air curtains directed towards each other and slightly outwardly of the opening 12.

It will also be appreciated that the system 10 and method of the present invention could be used with little or no modifications in more conventional applications such as with buildings, where an opening of the building, such as a loading/unloading dock, would need to be covered by an air curtain. The system 10 and method of the present invention is ideal for those applications where space or cost would otherwise prohibit the implementation of a plurality of large, heavy, high power consuming blower assemblies in an overhead arrangement.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A pressurized airflow generating system adapted for use with an aircraft to provide an air curtain adjacent a portion of said aircraft, and wherein said aircraft includes a power unit for generating a pressurized airflow, said system comprising:

at least one air intake duct operably associated with said aircraft to enable an ambient airflow to be drawn into said air intake duct;

an intake fan operably associated with said air intake duct for drawing said ambient airflow into said air intake duct and creating an intake airflow having a first velocity within said air intake duct;

a manifold having an inlet and an outlet, said inlet being operably associated with said air intake duct to receive said ambient airflow drawn into said air intake duct;

a conduit having a first end in flow communication with said power unit for receiving said pressurized airflow, and a second end;

an injection nozzle in flow communication with said second end of said conduit for injecting said pressurized airflow into said air intake duct in the same direction as said intake airflow; and said pressurized airflow operating to accelerate said intake airflow to produce a high pressure airflow having a second velocity greater than said first velocity through said outlet of said manifold to thereby form said air curtain.

2. The system of claim 1, further comprising an air dispenser disposed at said outlet of said manifold for directing said high pressure airflow through said outlet into a narrow, width-wise airstream, thereby forming said air curtain.

3. The system of claim 2, wherein said manifold is disposed for rotatable movement about an axis extending longitudinally along and parallel to said manifold.

4. The system of claim 1, wherein said manifold is disposed for rotatable movement about an axis extending longitudinally along and parallel to said manifold; and wherein said system further comprises a mechanism for rotating said manifold to a desired angular position relative to a vertical axis, to thereby direct said air curtain at a desired angle relative to said vertical axis.

5. The system of claim 4, wherein said mechanism comprises an electric stepper motor.

6. The system of claim 4, further comprising a position controller operably associated with said mechanism for controlling said mechanism in accordance with a position of a moveable portion of said aircraft which said air curtain impinges, to thereby control an angular position of said manifold relative to said moveable portion of said aircraft.

7. The system of claim 1, further comprising a flow control valve disposed in said conduit to control said pressurized airflow therethrough; and a flow controller operably associated with said flow control valve for controlling said flow control valve, to thereby control a rate of flow of said pressurized airflow through said conduit to said injection nozzle.

8. The system of claim 1, further comprising:

an air dispenser disposed at said outlet of said manifold for directing said high pressure airflow in a narrow, width-wise airstream to thereby form said air curtain;

said manifold being disposed for rotational movement about an axis extending longitudinally along said manifold;

a motor for rotating said manifold; and a position controller for controlling said motor to thereby control said position of said manifold to maintain said air curtain in accordance with a desired angular position.

9. The system of claim 4, further comprising:

an optical sensor disposed adjacent said manifold for optically monitoring an angular position of said manifold; and a position controller responsive to an output of said optical sensor for controlling said mechanism for rotating said manifold to thereby position said manifold at a desired angular position.

10. A method for producing an air curtain adjacent a portion of an aircraft, said method comprising the steps of:

generating an intake airflow having a first velocity within a conduit placed adjacent an opening in said aircraft;

injecting a pressurized airflow from a power unit of said aircraft into said conduit to mix with said intake airflow to thereby form a pressurized, high velocity airstream having a second velocity substantially greater than said first velocity; and directing said pressurized, high velocity airstream from said conduit through a flow directing member over said opening in said aircraft to form said air curtain.

11. The method of claim 10, further comprising the step of rotating said flow directing member to thereby direct said air curtain at a desired angle relative to a vertical axis.

12. The method of claim 11, wherein the step of rotating said flow directing member comprises the step of using an electric motor to rotate said conduit; and using a controller to control said electric motor.

13. A pressurized airflow generating system adapted for use with an aircraft to provide an air curtain adjacent a portion of said aircraft, and wherein said aircraft includes a power unit for generating a pressurized airflow, said system comprising:

a conduit having first and second portions, said first portion being disposed to enable an ambient airflow to be drawn thereinto;

an intake fan operably associated with said first portion of said conduit for drawing said ambient airflow into said first portion of said conduit and creating an intake airflow having a first velocity within conduit;

said second portion of said conduit forming a manifold adapted to be disposed adjacent said portion of said aircraft;

an injection system adapted to receive a pressurized airflow from said power unit and to inject a high velocity jet stream airflow having a second velocity into said conduit in the same direction as said intake airflow, wherein said second velocity is substantially greater than said first velocity;

said high velocity jet stream airflow operating to accelerate said ambient airflow to produce a high pressure airflow through an outlet of said manifold to thereby form said air curtain; and a system for rotationally moving said manifold portion to precisely direct said air curtain at a desired orientation relative to said portion of said aircraft.

* * * * *